United States Patent [19]

Degen et al.

[11] Patent Number: 4,774,001

[45] Date of Patent: Sep. 27, 1988

[54] SUPPORTED MICROPOROUS MEMBRANE

[75] Inventors: Peter J. Degen, Huntington; Thomas C. Gsell, Glen Cove, both of N.Y.

[73] Assignee: Pall Corporation, Glen Cove, N.Y.

[21] Appl. No.: 107,918

[22] Filed: Oct. 13, 1987

Related U.S. Application Data

[63] Continuation of Ser. No. 685,042, Dec. 21, 1984, abandoned.

[51] Int. Cl.$^4$ .............................................. B01D 13/00
[52] U.S. Cl. ..................................... 210/490; 55/528; 210/500.27; 210/510.1; 428/287
[58] Field of Search .................. 210/490–492, 210/496, 506, 510, 500.30, 500.36, 500.38, 500.41, 500.42, 500.27; 55/528; 428/286, 287

[56] References Cited

U.S. PATENT DOCUMENTS

| | | |
|---|---|---|
| 2,774,704 | 12/1956 | Smith . |
| 2,945,773 | 7/1960 | Panagrossi et al. . |
| 3,053,762 | 9/1962 | Adiletta . |
| 3,231,460 | 1/1966 | Andrews . |
| 3,573,158 | 3/1971 | Pall et al. . |
| 3,744,642 | 7/1973 | Scala et al. ........................ 210/500 |
| 3,811,957 | 5/1974 | Buntin ................................. 136/146 |
| 3,825,379 | 7/1974 | Lohkamp et al. ................... 425/72 |
| 3,825,380 | 7/1974 | Harding et al. ..................... 425/72 |
| 3,849,241 | 11/1974 | Butin et al. ......................... 161/169 |
| 3,933,557 | 1/1976 | Pall ..................................... 156/167 |
| 3,950,599 | 4/1976 | Board, Jr. . |
| 3,962,153 | 6/1976 | Gore . |
| 4,379,192 | 4/1983 | Wahlquist et al. . |
| 4,420,441 | 12/1983 | Singer . |
| 4,431,545 | 2/1984 | Pall et al. ........................... 210/641 |
| 4,460,425 | 3/1984 | Rauser et al. . |

FOREIGN PATENT DOCUMENTS

| | | |
|---|---|---|
| 0087228 | 8/1983 | European Pat. Off. . |
| 0084768 | 8/1983 | European Pat. Off. . |
| 0090483 | 10/1983 | European Pat. Off. . |
| 0096339 | 12/1983 | European Pat. Off. . |
| 551339 | 2/1943 | United Kingdom . |
| 730911 | 6/1955 | United Kingdom . |
| 766803 | 1/1957 | United Kingdom . |
| 1117751 | 6/1965 | United Kingdom . |
| 1582790 | 1/1981 | United Kingdom . |

OTHER PUBLICATIONS

Oberg et al., Machinery's Handbook, 20th ed., Industrial Press Inc., pp. 412–413 (1978).
Meares, P., *Membrane Separation Processes*, Elsevier Scientific PVB. Co., N.Y., 1976, p. 82.

*Primary Examiner*—Frank Sever
*Attorney, Agent, or Firm*—Leydig, Voit & Mayer

[57] ABSTRACT

A supported microporous membrane comprising a composite of a microporous membrane and a synthetic thermoplastic web of microfibers secured to the membrane without the use of added adhesive components and having an ASTM D903 peel strength of at least about 2 grams per centimeter, the composite having a modulus of flexure at least 10 percent greater than that of the membrane, and the method of manufacturing such supported membranes by contacting thermoplastic microfibers with the membrane while the microfibers are at an elevated temperature.

12 Claims, 1 Drawing Sheet

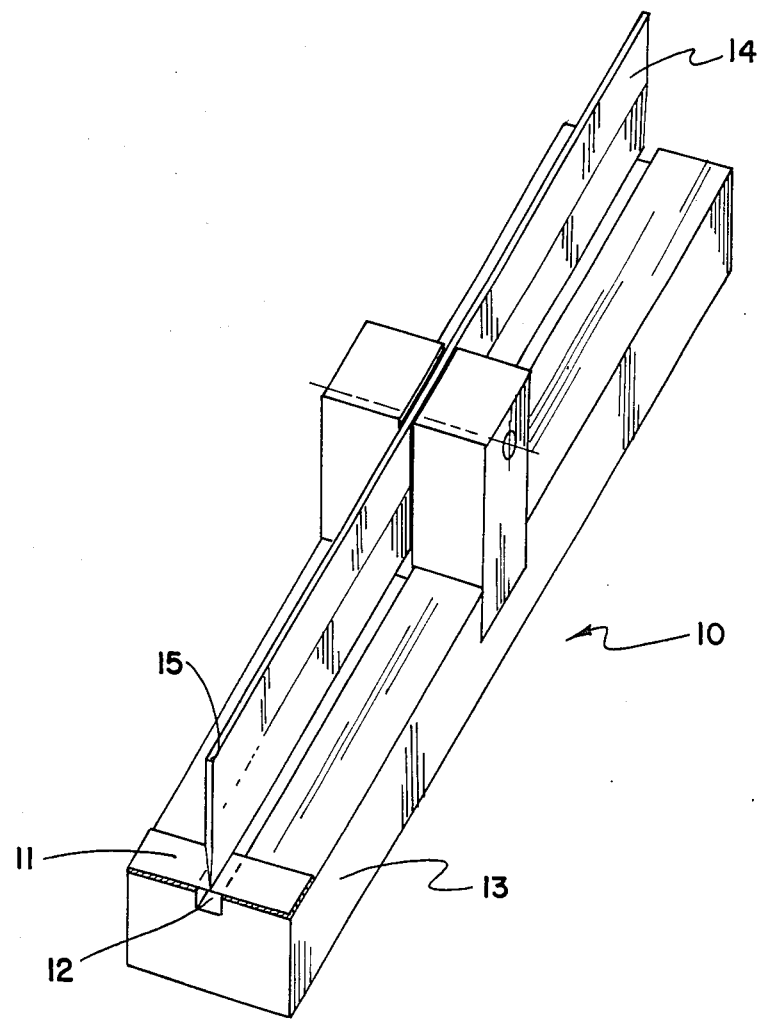

SUPPORTED MICROPOROUS MEMBRANE

This application is a continuation of application Ser. No. 685,042, filed Dec. 21, 1984, abandoned.

TECHNICAL FIELD p This invention relates to microporous membranes and, more particularly, to supported microporous membranes particularly useful in filtration applications and a process for preparing such membranes.

BACKGROUND ART

Many filtration applications require the removal of particles in the micron and submicron ranges from a fluid medium. Microporous filtration media employed for such purposes are typically relatively delicate structures which are easily damaged. For example U.S. Pat. No. 4,431,545 discloses a hydrophilic, microporous filter system having ultrafiltration capability, i.e., the ability to remove particles as fine as about 0.001 micrometer up to about 10 micrometers. A preferred filter medium for use in the system of U.S. Pat. No. 4,431,545 is a thin, typically a few mils thick, microporous polyamide membrane. This membrane is difficult to work with because of its limited strength and its lack of internal rigidity. In many other similar uses, the microporous membranes used are also thin, relatively delicate structures with little internal rigidity and very low flexural moduli, i.e., they do not retain their shape when unsupported, typically hanging limply in loose folds, much as a piece of thin cloth drapes when unsupported.

The combination of their relatively delicate nature (limited strength) and lack of internal rigidity (low flexural modulus or modulus of lexure) creates difficulties in working with such membranes, e.g., in corrugating them to increase the surface area available in a filter element or the like.

One approach used to overcome these difficulties is to cast the membrane, e.g., by the method described in U.S. Pat. No. 4,340,479, onto a substrate, such as a fibrous web or mat, which is incorporated into the membrane and becomes a permanent part of the structure, thereby enhancing both the strength and the flexural modulus of the membrane. Offsetting the desirable increase in strength and flexural modulus is an undesirable increase in the pressure drop of the membrane.

For example, polyamide membranes having an absolute pore rating of 0.2 micrometer are commercially available from Pall Corporation under the trademark ULTIPOR. For an unsupported (i.e., no internal fibrous mat support) double layer membrane of this type, the pressure drop at an air flow rate of twenty-eight feet per minute is nine inches of mercury. For an equivalent supported, double layer membrane with the same pore rating, the pressure drop is twenty-five inches of mercury, nearly a three-fold increase. This pressure drop difference is highly significant in the operation of an on-line filtration system. For example, in the pharmaceutical industry, efficient, fast filtration at reasonable pressure levels is often important in the processing of sensitive compositions such as parenterals. With the particular polyamide membranes described above, the time to filter a typical pharmaceutical industry fluid at a specified pressure would be 2.8 times longer for the supported membrane with clean membranes and relatively low contaminant levels in the fluid being filtered. For this reason, in many applications the unsupported membrane is highly preferred. Offsetting the advantage of lower pressure drops with concomitant higher filtration rates at comparable pressures is the difficulty in working with the delicate, low strength, low flexural modulus of the unsupported membrane. Care must be exercised in handling the delicate material since it is relatively easily damaged and any form of crack or tear, even a minor one, will render such material essentially useless as a filtration medium.

The difficulty of working with such delicate materials is further evidenced by the commercial unavailability in flat disc form of thin, fine pored, polytetrafluoroethylene (PTFE) membrane material—a highly desirable filtration medium for many applications. In addition to having a low flexural modulus and limited strength, PTFE and similar membrane materials have a tendency to become electrostatically charged. Such a material sticks to itself in a manner making it very difficult to maintain in flat or planar disc form. Additionally, because of the low flexural modulus and the difficulty in sealing PTFE membrane to support materials, e.g., a polypropylene housing, it is difficult to manufacture filter structures incorporating this type of membrane in such housings. For example, in biomedical applications it is often desired to insert a precut flat or planar filter piece into a preformed support structure and tightly seal the periphery of the filter piece to the support structure. Unsupported PTFE can not readily be used in such a manner because of its low flexural modulus, which makes accurate placement troublesome, and the difficulty in sealing it to the support structure.

The subject invention is directed to supported microporous membranes which substantially overcome the difficulties described above in working with such relatively low strength, low flexural modulus membranes. Indeed, as described in detail below, the supported microporous membranes in accordance with this invention also provide additional advantages in certain filtration applications.

DISCLOSURE OF INVENTION

In accordance with the subject invention, a method is provided for manufacturing a supported microporous membrane comprised of a microporous membrane and a synthetic thermoplastic web of microfibers secured to the membrane without the use of added adhesive components comprising:

(a) extruding a synthetic thermoplastic polymeric material from a fiberizing die and attenuating the extruded polymeric material to form microfibers by the application of one or more gas streams;

(b) directing the microfiber-forming stream toward a sheet of the microporous membrane;

(c) contacting the microfiber-forming stream while at an elevated temperature with the microporous membrane; and (d) cooling the resulting composite structure to form the supported microporous membrane wherein a web the microfibers is secured to the membrane.

A supported microporous membrane is also provided comprising a composite of a microporous membrane and a synthetic thermoplastic polymeric web of microfibers secured to the membrane without the use of added adhesive components. THus, securing of the microfibers to the membrane consists solely of microfiber/membrane interfaces. The resulting composite structure preferably has an ASTM D903 peel strength of at least about two grams per centimeter and a modulus of flexure of at least about ten percent higher than the membrane itself.

BRIEF DESCRIPTION OF DRAWINGS

FIG. 1 is an illustration of the device used in determining the flexural modulus of the supported microporous membranes in accordance with this invention.

BEST MODE FOR CARRYING OUT THE INVENTION

The supported microporous membranes in accordance with this invention are preferably produced by the use of a continuous, melt-blowing process to form the desired microfibers which are then contacted with the microporous membrane. In preparing the microfibers, a heated thermoplastic resinous material, such as polypropylene, one of the preferred materials, is forced through the die head having a row of die openings and the extruded material is attenuated in a gas stream formed by gas jets adjacent the die openings. The attenuation of the thermoplastic resinous material results in very fine fibers, for example, as fine as about 0.1 micrometer ranging up to about 25 micrometers, preferably in the range of from about 1 to 15 micrometers, and more preferably in the range of from about 1.5 to 10 micrometers.

A substantial body of art has developed over the past twenty-five years directed to the preparation of very fine fibers by this general process. Early work in the area was done at the Naval Resarch Laboratory and is reported in, for instance, *Industrial and Engineering Chemistry*, Volume 48, Number 8 (1956), pages 1342–1346. Relevant patents disclosing appropriate apparatus and discussing processing variables, including methods for controlling the level of attenuation of the fibers, the density of the formed mats and the like, include U.S. Pat. Nos. 3,811,957, 3,849,241, 3,825,379, 3,825,380, and 3,933,557. The general method described in these references is used in preparing the microfibers used in preparing the supported microporous structures in accordance with the subject invention.

The composite structures in accordance with the subject invention are preferably prepared by carrying a continuous sheet of the microporous membrane past one or more fiber-forming stations in a continuous fashion with the fibers, as they are extruded and attenuated, being directed to impinge on the microporous membrane as it passes at a preset distance past the fiber-forming station.

Depending on the desired level of lay down of the microfibers on the microporous membrane, more than one fiber-forming station may be used in sequence with the web passing continuously past the fiber-forming stations in sequence. If a structure comprising the microporous membrane with a thermoplastic web of microfibers on both sides thereof is desired, the intermediate composite of microfibers and the microporous membrane formed in the first pass can be turned over and passed adjacent the fiber-forming station or stations a second time to provide the three layer composite structure.

The manner of lay down of the microfibers on the microporous membrane is controlled to provide the desired thickness or amount of the microfibers secured to the web and the desired degree of fineness of the fibers. Additionally, to ensure adequate adhesion of the microfibers to the microporous membrane, it is critical that at least a portion of the microfibers, at the time of impingement on the microporous membrane, be at an elevated temperature sufficient to provide the thermoplastic microfibers with a viscosity low enough that the resin retains the ability to flow to at least a limited, extent in order that adequate adhesion and the formation of an interface between the microfibers and the microporous membrane be attained. The requisite temperature is slightly above the melting point of the thermoplastic used to form the microfibers. In practice, the degree of adhesion and, hence, the peel strength, can be varied by adjusting various factors, for example, the distance between the fiberizing die and the microporous web.

The supported microporous membranes in accordance with this invention comprise a composite of the microporous membrane and a synthetic thermoplastic web of microfibers secured to the membrane without the use of added adhesive components. Preferably, they have an ASTM D903 peel strength of at least about two grams per centimeter, more preferably from about 5 to about 30 grams per centimeter, and most preferably from about 20 to 30 grams per centimeter. It should be noted that, for most applications, there is no maximum limit peel strength. Indeed, it has been found that in some applications the peel strength or adhesive strength between the microfibers and the microporous membrane is greater than the cohesive strength of the web of microfibers itself or of the microporous membrane and, when attempts are made to separate the web of microfibers from the microporous membrane, the bonds between the microfibers of the web will separate or the integrity of the microporous membrane will be destroyed before the bonds between the microfibers and the microporous membrane are broken.

The supported microporous membranes in accordance with the subject invention also have flexural moduli which are preferably at least about ten percent, and more preferably one hundred percent or more, greater than the microporous membrane.

Definition and Measurement of the Modulus of Flexure

This test measures the ability of the test specimen to resist flexural deformation. This ability is particularly important when the filter membrane is formed into pleated structures, such as those commonly used in filtration devices.

The test is performed on a specimen of the test material which is 1.0 inch in length by 0.25 inch in width. One or more layers having these dimensions are tested in the manner described below.

The test specimen is placed in the test device 10 depicted in FIG. 1. The specimen 11 is placed across and at the end of the channel or groove 12 in the base 13 of the test device 10. The dimensions of the channel are 0.150 inch wide and 1/16th inch deep. A 6 inch long V-shaped blade 14 (6 inches long, ¾ inch high, 0.0036 inch thick at the top and tapering to a knife edge at the bottom edge) pivoted at the center, i.e., 3 inches from either end and on a center line 0.2 inches below the top edge of the blade, is positioned centrally over and parallel to the channel 12 at a height such that the bottom of the V-shaped bar is 0.028 inch above the top of the channel (when the bottom edge of the V-shaped bar is parallel to the channel). A downward force W is applied to the top of the V-shaped bar 14 at 15 with the magnitude of the force measured by a force gauge (not shown). Coincident with the application of the measured force, the vertical deflection, D, is accurately measured by means of a microscope equipped with a scaled eye piece. The applied force and the deflection must not be so great as to cause a permanent set of the test sample, i.e., at the end of the test the specimen should resume its original flat form.

In the calculations below, the width of the channel 12 is given as L, in inches, W is the force applied in pounds, and D is the vertical deflection of the membrane at its center, in inches. The number of layers tested is n.

For purposes of this invention, the term flexural modulus is defined in a different sense than the usual symbol, E, which is the elastic modulus in conventional mechanical engineering stress calculations. Flexural modulus, M, as defined herein, relates more closely to a quantity defined in usual engineering terms as EI, the product of the elastic modulus E, and the moment of inertia I. This is necessary because of the composite nature of the structures in accordance with the subject invention.

In terms of the test described above, EI will be denoted as M and is equivalent to EI as defined in Case 2, pages 412–413 of the 20th edition of "Machinery's Handbook", *Industrial Press* 200 Madison Avenue, New York, N.Y. 10016. It is calculated as follows:

$$M = WL^3/48Dn$$

As opposed to the behavior of a metal when deformed purely elastically, the value of M for a composite may vary somewhat depending on the deflection at which it is measured. For this reason, the deflection at which M is determined must be reported along with the value of M.

The unsupported microporous membranes useful in the subject invention typically have flexural moduli, determined as described above, ranging from less than $10^{-6}$ to about $10^{-3}$ lb-in$^2$. The unsupported membranes typically have thicknesses ranging from about 0.5 to about 8 mils, more preferably from about 1 to about 4 mils, and voids volumes ranging from about 70 to about 85 percent. It is these high voids volumes which provide the desirable low pressure drops of the membranes. Conversely, it is the high voids volumes which contribute to the relatively low strength and low moduli of flexure.

Typically, the supported microporous membranes in accordance with the subject invention have moduli of flexure, determined as described above, in the range of from about $10^{-6}$ to about $10^{-2}$ lb-in$^2$, more preferably from about $3 \times 10^{-6}$ to about $3 \times 10^{-3}$ lb-in$^2$.

The flexural modulus is, of course, in part determined by the amount of the microfibrous thermoplastic material laid down on the microporous membrane. For some applications, only a minimum thickness of the microfibers is desired since an absolute minimum increase in pressure drop is desired and only miminal increase in flexural modulus is required. This type of structure is useful where the primary concern is the sealing of the microporous membrane to a support structure. More typically, the amount of the microfibers laid down on the microporous membrane will be such as to provide a thickness of the supporting web of microfibers as much as about fifteen times or more the thickness of the microporous membrane itself, typically ranging from about five to about fifteen times the thickness of the membrane. If a substantial quantity of microfibers is laid down, the resulting composite may be sufficiently rigid or board-like to enable it to be used as a filter medium capable of bridging relatively large spans without auxiliary support. Typically, the weight or amount of microfibers secured to the microporous membrane per square foot is in the range of from about 0.2 to about 10 grams.

While it is possible to achieve higher flexural moduli and, hence, higher rigidity by thickening the microporous membrane, such thickening is, for many applications, undesirable because it increases pressure drop and, in most cases, also increases cost.

The composite structures in accordance with the invention can be tailored to form a range of products with varying desirable properties. For example, if it is desired to minimize any increase in pressure drop resulting from adhering the microfibrous web to the membrane, a very thin layer of fibers can be secured to the membrane. The resulting composite structure will have essentially no increase in pressure drop and a limited increase in flexural modulus. However, it will be much more readily secured to a typical filter support structure. For example, by adhering a monolayer of polypropylene microfiber to a PTFE microporous membrane, the resulting structure, e.g., in the form of a flat circular disc, can easily be secured about its periphery to a polypropylene filter support structure by simple application of heat or ultrasonic energy together with light pressure.

Conversely, if a relatively thick layer of microfibers is secured to the membrane, the web of microfibers can function as a prefilter in liquid filtering applications to avoid early loading of the relatively fine microprous membrane, thereby increasing filter life.

Composite structures in accordance with this invention may also find application as insulation structures, particularly for clothing. By judicious selection of the microporous membrane and the amount of microfibers secured to the membrane, a desirable insulating structure can be achieved. For example, in the insulation of winter clothing, e.g., skiwear, the combination of a water-repellent microporous PTFE membrane and polypropylene microfibers would be desirable, the PTFE membrane allowing the structure to breathe by virtue of its microporous structure while precluding the passage of water by virtue of its non-wettability and the polypropylene microfiber web providing insulation capability. The microfibrous web/microporous membrane composite can be secured to a layer of the cloth if desired.

The composite structures in accordance with the subject invention which can be formed without the use of added adhesive components have the added advantage of being substantially free of media migration which can occur when adhesives are used in filter media. This advantage is important in many applications such as the filtration of water supplied for critical applications in industry and the medical field, e.g., microelectronics manufacture and water used for injection into humans.

Suitable microporous membranes which can be used in the subject invention include membranes prepared from a variety of synthetic polymeric materials, including polyamides, polytetrafluoroethylene and other perfluorinated polyolefins, polyvinylidene difluoride, polysulfone, polyvinylidene chloride, cellulose esters, and the like. Typically, these materials will have pore sizes ranging from less than about 0.001 to about 10 micrometers or more. A preferred class of such membranes are the unskinned polyamide membranes of the type described in U.S. Pat. No. 4,340,479, the disclosure of which is incorporated herein by reference. Other membranes which can be used are the charge-modified membranes disclosed in the EPO published applications, Publication Numbers 0090483 and 0087228, the polyvinylidene difluoride membranes of the type disclosed in U.S. Pat. Nos. 4,203,847 and 4,203,848, and polytetrafluoroethylene membrane prepared as generally described in U.S. Pat. Nos. 3,953,566 and 4,187,390.

A variety of thermoplastic resinous materials may be used to form the microfibers used in this invention. Exemplary materials include polyamides, linear polyesters, such as esters of ethylene glycol and terephthalic acid, polyolefins, such as polypropylene, polyethylene, polymethyl pentene, and polyisobutylene, as well as copolymers, such as ethylenepropylene. Mixtures or blends of such polymers can also be used.

The subject invention will be better understood by reference to the following examples, which are offered by way of illustration.

EXAMPLES

The following general procedures were used to prepare and test supported microporous structures of the type described above. Structures were prepared by the general method described above by depositing polypropylene microfibers having an average diameter of about 5 micrometers onto thin porous membranes (as described in Table I below). The operating conditions in depositing the polypropylene microfibers on the membrane were adjusted such that a portion of the polypropylene was above its melting point of about 170 degrees Centigrade at the time of contact with the membrane and 2.5 grams per square foot of microfibers were deposited on the membrane.

In Example 1, the PTFE membrane, in the form of a continuous sheet 40 inches in width, was carried past fiber-forming stations to form the composite supported microporous membrane or structure and the resulting composite structure was collected as a roll. The supported membranes of Examples 2 and 3 were prepared by exposing a small piece (about 1 foot²) of the respective membrane to a fiberforming station until the same level (2.5 grams per square foot, as in Example 1) of polypropylene microfibers was deposited.

Samples of the resulting composite structure were tested for various properties important to its use as a filtration medium. These included peel strength, tensile strength, pressure drop, modulus of flexure, filtration efficiency and resistance to clogging.

TABLE I

| Example | Description of Membrane |
|---------|------------------------|
| 1 | Polytetrafluoroethylene (PTFE) having an average pore size of about 0.2 micrometer and a thickness of about 0.002 inch |
| 2 | Nylon 66 having and average pore size of about 0.2 micrometer and a thickness of about 0.006 inch |
| 3 | Polyvinylidene difluoride having an average pore size of about 0.1 micrometer and a thickness of about 0.002 inch. |

The test methods and the results obtained are set out below.

A. Peel Strength

This test was carried out in accordance with ASTM D903 using one-half inch wide strips of the subject composite material, tested in the machine direction. The results are set out in Table II below:

TABLE II

| Example | Peel Strength (gm/cm width) |
|---------|------------------------------|
| 1 | 26.7 |
| 2 | Web of polypropylene microfibers pulled apart rather than peeling off membrane |
| 3 | Web of polypropylene microfibers pulled apart rather than peeling off membrane |

B. Pressure Drop

This test was carried out by fixing a sample of the material being tested in a jig which allows passage of air through the sample at a measured velocity while the differential pressure is measured. In this test the differential pressure was measured while maintaining a flow rate of 28 feet per minute of air (at ambient conditions) through the specimen being ested, i.e., either the base membrane by itself or he corresponding supported membrane. The results re set out in Table III below:

TABLE III

| Example | Specimen Tested | Pressure Drop |
|---------|-----------------|---------------|
| 1 | Membrane alone | 13.4 inches, water gauge |
|   | Supported Membrane (Composite Structure) | 13.6 inches, water gauge |
| 2 | Membrane alone | 9.1 inches mercury gauge |
|   | Supported Membrane (Composite Structure) | 9.2 inches, mercury guage |
| 3 | Membrane alone | 12.6 inches, mercury gauge |
|   | Supported Membrane (Composite Structure) | 12.6 inches, mercury gauge |

As can be seen from Table III, the increase in pressure drop was quite small in all three examples. In Example 3, there was no increase.

C. Flexural Modulus

This test was carried out using the device described in FIG. 1 and the method described above under the heading "Definition and Measurement of the Modulus of Fluxure". The deflection D was, in each case, 0.0025 inch. The flexural modulus for the multilater tests was performed with the microporous membrane on the upper surface, as would be the case in many types of filtration service. The results are set out in Table IV below:

TABLE IV

| Example | n | W | M (lb-in²) |
|---------|---|---|------------|
| 1 Membrane alone | 16 | 1.0 gm | $3.9 \times 10^{-6}$ |
| Supported Membrane (Composite Structure) | 1 | 0.8 gm | $5.0 \times 10^{-5}$ |
| 2 Membrane alone | 3 | 0.9 gm | $1.9 \times 10^{-5}$ |
| Supported Membrane (Composite Structure) | 1 | 0.7 gm | $4.4 \times 10^{-5}$ |
| 3 Membrane alone | 2 | 0.6 gm | $1.9 \times 10^{-5}$ |
| Supported Membrane | 2 | 0.8 gm | $2.5 \times 10^{-5}$ |

TABLE IV-continued

| Example (Composite Structure) | n | W | M (lb-in²) |
|---|---|---|---|

As can be seen from Table IV, the modulus of flexure of the membrane was increased substantially in each case by compositing it with the microfibrous web.

D. Filtration Efficiency/Clogging Resistance

This test was performed by challenging the particular medium being tested, i.e., the composite structure or the PTFE membrane alone, with a 0.3 micrometer diameter aerosol of dioctylpthalate (DOP) using a test device, DOP Penetrometer Model Q-127, available from Air Techniques Incorporated. The concentration of aerosol applied to the test medium was fixed at about 0.08 milligrams per liter. The velocity of the aerosol (in air) through the medium being tested was 2.8 feet per minute. The filtration efficiency was measured and expressed as percent of the aerosol penetrating through the test medium. The pressure drop across the sample was measured in each case when the quantity of aerosol incident on the filter medium reached 1.5 grams. The microporous membrane was downstream during these tests. The ratio of that pressure drop to the clean pressure drops, along with the measure of penetration, is set forth in Table V below:

TABLE V

| Sample | Ratio of Pressure Drop at End of Test to Pressure Drop at Start | Percent Penetration By Weight |
|---|---|---|
| PTFE membrane only | 3.5 | 0.0005 |
| PTFE membrane/microfiber composite of Example 1 (microfibers upstream) | 1.23 | 0.0001 |
| PTFE membrane preceded by a microfiber filter of the same type as that used in making the composite structure but not adhered to the membrane | 1.35 | 0.0002 |

The results of these tests show that the composite structure in accordance with the subject invention is superior to both the PTFE membrane alone as well as a non-adhered PTFE membrane/microfiber combination. Specifically, the composite structure in accordance with the subject invention has a substantial peel strength and only a slight increase in differential pressure. It also has a substantial increase in rigidity, as reflected by a larger modulus of flexure, and, correpondingly, better ability to be handled in comparison with the PTFE membrane itself, which is a relatively limp, difficult material to work with. The increase in rigidity and corresponding increase in the ability to work with the structure makes the composite structure in accordance with the subject invention very useful as a flat filtration medium or for use in the formation of pleated (corrugated) filtration structures.

From the standpoint of filtration performance, the composite structure in accordance with the subject invention was found to have a much greater capacity for the removal of aerosol, as evidenced by the results set out in Table V, as well as greater efficiency for removal.

Filter Lifetime Test

This test measures the ability (capacity) of a filtration membrane to filter a fluid while maintaining a differential pressure of less than 20 psi across the membrane. A constant flow rate of 300 ml/min/sq.ft was maintained throughout the test. A rise in differential pressure was noted as the test progressed. When a 20 psid differential pressure (pressure drop) was reached, the test was stopped and the total volume of filtered fluid was measured.

The fluid filtered in this test was prepared by dissolving 0.5 grams of hydroxyethylcellulose (QP100M available from Union Carbide Corporation) in 1,000 grams of deionized water. In this test an effective area of 0.02 square feet was used with a flow rate of 6 milliliters per minute. The results are set out in Table VI below:

TABLE VI

| | Total Volume Fluid Filtered (Milliliters) |
|---|---|
| A. PTFE Supported Membrane (Composite Structure) of Example 1 (microfibers upstream) | 108 |
| B. PTFE Base Membrane only | 23 |

The composite provided a filtration life of over four times that of the base membrane alone.

Tensile Strength Test

Composite filter membranes of the subject invention were tested for ultimate tensile strength in accordance with ASTM D882 using 0.5 inch wide strips. For comparison, the base membranes used to prepare the composites were also tested, i.e., without an adhered layer of polymer microfiber. The results are set out in Table VII below.

TABLE VII

| Example | Tensile Strength |
|---|---|
| 1. PTFE Composite Structure | 4.7 lb/inch |
| PTFE Membrane only | 2.2 lb/inch |
| 2. Nylon 66 Composite Membrane | 7.9 lb/inch |
| Nylon 66 Membrane only | 4.0 lb/inch |
| 3. Polyvinylidene difluoride Composite Membrane | 5.6 lb/inch |
| Polyvinylidene difluoride Membrane only | 3.4 lb/inch. |

The composite structures had tensile strengths at least 65 percent greater than the base membranes alone.

We claim:

1. A supported, microporous membrane comprising a composite of a non-fibrous, synthetic polymeric microporous membrane secured directly to a synthetic thermoplastic polymeric web of microfibers, said composite having an ASTM D903 peel strength of at least about 2 grams per centimeter, the pore diameter of the microporous membrane being finer than that of said polymeric web of microfibers, the securing of said non-fibrous, synthetic polymeric microporous membrane to said synthetic thermoplastic polymeric web of microfibers consisting solely of microfiber/membrane interfaces.

2. The supported microporous membrane of claim 1 wherein said polymeric web of microfibers is secured to said microporous membrane with an ASTM D903 peel strength of at least about 2 grams per centimeter and the modulus of flexure of said supported microporous membrane is at least about 10 percent greater than that of said microporous membrane.

3. The supported microporous membrane of claim 2 wherein said supported microporous membrane is a flat disc.

4. The supported microporous membrane of claim 2 wherein said microporous membrane is selected from the class consisting of polyamides, perfluorinated polyolefins, polysulfone, polyvinylidene chloride, and cellulose esters.

5. The supported microporous membrane of claim 4 wherein said microporous membrane is selected from the class consisting of polytetrafluoroethylene, polyvinylidene difluoride and nylon 66.

6. The supported microporous membrane of claim 5 wherein said microfibers are comprised of a polyolefin.

7. The supported microporous membrane of claim 6 wherein said polyolefin is polypropylene.

8. The supported microporous membrane of claim 2 wherein said modulus of flexure of said supported microprous membrane is at least about 100 percent greater than that of said microporous membrane, said microporous membrane comprises polytetrafluoroethylene, and said web of microfibers comprises polypropylene present at a level of from about 1 to about 10 grams per square foot of said microporous membrane.

9. The supported microporous membrane of claim 2 wherein said modulus of flexure of said supported microporous membrane is at least about 100 percent greater than that of said microporous membrane, said microporous membrane comprises polyvinylidene difluoride, and said web of microfibers comprises polypropylene present at a level of from about 1 to about 10 grams per square foot of said microporous membrane.

10. The supported microporous membrane of claim 2 wherein said modulus of flexure of said supported microporous membrane is at least about 100 percent greater than that of said microporous membrane, said microporous membrane comprises nylon 66, and said web of microfibers comprises polypropylene present at a level of from about 1 to about 10 grams per square foot of said microporous membrane.

11. The supported microporous membrane of claim 1 wherein the pressure drop across said composite is substantially the same as the pressure drop across said non-fibrous, synthetic polymeric microporous membrane.

12. A supported, microporous membrane comprising a composite of a non-fibrous, synthetic polymeric microporous membrane secured directly to a synthetic thermoplastic polymeric web of microfibers, said composite having an ASTM D903 peel strength of at least about 2 grams per centimeter, the pore diameter of the microporous membrane being finer than that of said polymeric web of microfibers, the scouring of said fibrous, synthetic polymeric microporous membrane to said synthetic thermoplastic polymeric web of microfibers consisting solely of microfiber/membrane interfaces and said composite being essentially free of added adhesive components.

* * * * *